US011132522B2

(12) United States Patent
Mueller et al.

(10) Patent No.: US 11,132,522 B2
(45) Date of Patent: Sep. 28, 2021

(54) SENSORS CONFIGURED TO OPERATE AT MULTIPLE RESOLUTIONS

(71) Applicant: NEXT BIOMETRICS GROUP ASA, Oslo (NO)

(72) Inventors: Robert Mueller, Riemerling (DE); Matias N. Troccoli, Kirkland, WA (US); King Hong Kwan, Bellevue, WA (US)

(73) Assignee: NEXT Biometrics Group ASA, Oslo (NO)

(*) Notice: Subject to any disclaimer, the term of this patent is extended or adjusted under 35 U.S.C. 154(b) by 123 days.

(21) Appl. No.: 16/536,918

(22) Filed: Aug. 9, 2019

(65) Prior Publication Data

US 2021/0042489 A1 Feb. 11, 2021

(51) Int. Cl.
*G06K 9/00* (2006.01)
*G06K 9/03* (2006.01)

(52) U.S. Cl.
CPC ........... *G06K 9/0002* (2013.01); *G06K 9/036* (2013.01)

(58) Field of Classification Search
CPC ...... G06K 9/0002; G06K 9/036; G06F 21/32; G05B 2219/37351
See application file for complete search history.

(56) References Cited

U.S. PATENT DOCUMENTS

| 2009/0067684 A1 | 3/2009 | Mainguet |
| 2012/0199724 A1 | 8/2012 | Nomura et al. |
| 2013/0287274 A1* | 10/2013 | Shi .......... G06F 3/0443 382/124 |
| 2016/0092735 A1 | 3/2016 | Govil et al. |
| 2016/0379037 A1* | 12/2016 | Russo ................ G06K 9/00114 382/125 |
| 2018/0218196 A1* | 8/2018 | Chhabra ............ G06K 9/00026 |
| 2020/0193128 A1* | 6/2020 | Son ..................... G06K 9/0008 |

FOREIGN PATENT DOCUMENTS

WO 2016209594 12/2016

OTHER PUBLICATIONS

Weidong Shi et al. (Multi Resolution Touch Panel with Built-in Fingerprint Sensing Support) (Year: 2013).*
International Search Report and Written Opinion received for counterpart International Application No. PCT/EP2020/072361, dated Nov. 24, 2020 (19 pages).

* cited by examiner

*Primary Examiner* — Edward F Urban
*Assistant Examiner* — Wassim Mahrouka
(74) *Attorney, Agent, or Firm* — Duane Morris LLP (57) ABSTRACT

In one aspect, a sensor includes an image acquisition controller and a pixel array. The pixel array includes a first set of pixels electrically coupled to the controller and a second set of pixels electrically coupled to the controller. The sensor is configured to operate in a first mode and a second mode. When operating in the first mode, the controller is configured to acquire signals from only the first set of pixels for generating a low-resolution image. When operating in the second mode, the controller is configured to acquire signals from both the first set of pixels and the second set of pixels for generating a high-resolution image.

18 Claims, 6 Drawing Sheets

SENSORS CONFIGURED TO OPERATE AT MULTIPLE RESOLUTIONS

BACKGROUND

Biometric security has attracted a great deal of attention. Fingerprint sensors are one form of technology used to provide such security. The fine patterns formed by ridges and valleys on the finger's skin can be mapped by sensing arrays. These sensing arrays have been used for a number of years in this field, but they vary in basic operating principles. Some sensors utilize heat signals, while others utilize electrical or optical signals. Accuracy levels are limited by the physical principles used to read fingerprint patterns (i.e., optical, capacitive, pressure, etc.). Furthermore, immunity to environmental variables such as dirt or humidity is also important when performing a fingerprint scan.

Active sensors quantify a specific physical parameter response to a given stimulus. One such method is the active thermal principle. In particular, active thermal sensors measure an object's heat conductance for a given heating stimulus. Examples of sensors of this type are disclosed in U.S. Pat. No. 6,091,837 to Dinh, entitled "Sensor for Acquiring a Fingerprint Image Based on Heat Transfer" and WO 2006/033582 A1, also to Dinh, entitled "Apparatus for Fingerprint Sensing and Other Measurements." The response to the stimulus is measured by each of the sensing sites within a sensor array. The thermal response of an element is in part a function of the stimulus provided, i.e., the larger the stimulus, the larger the response. Sensing sites are heated by application of an electrical current to the site.

Fingerprint sensors are often used in electronic devices to verify the identity of the user and to restrict access unless the sensor verifies that an authorized user is attempting to use the device. For example, certain smart credit cards require verification of the user via a fingerprint sensor before use. In certain instances, a high resolution fingerprint scanner may be required. For example, some government standards, such as personal identity verification (PIV), require a minimum resolution of 500 pixels per inch (ppi) for a fingerprint sensor and a minimum scan size corresponding to a standardized profile, such as Fingerprint Acquisition Profile (FAP)-10 (12.8×16.5 mm) or FAP-20 (15.24×20.32 mm). A disadvantage of typical fingerprint sensors is that many times a compromise is made between short scan time, low power consumption, maximum resolution and image quality.

SUMMARY

In one aspect, a sensor includes an image acquisition controller and a pixel array. The pixel array includes a first set of pixels electrically coupled to the controller and a second set of pixels electrically coupled to the controller. The sensor is configured to operate in a first mode and a second mode. When operating in the first mode, the controller is configured to acquire signals from only the first set of pixels for generating a low-resolution image. When operating in the second mode, the controller is configured to acquire signals from both the first set of pixels and the second set of pixels for generating a high-resolution image.

In another aspect, a sensor includes a pixel array, a first set of address lines, and a second set of address lines. The pixel array includes a plurality of rows and a plurality of columns. Each column of pixels includes a first set of pixels and a second set of pixels. The first set of pixels is electrically coupled to the first set of address lines and the second set of pixels is electrically coupled to the second set of address lines. The first set of address lines is operable in a low resolution mode of the sensor and both the first set of address lines and the second set of address lines are operable in a high resolution mode of the sensor.

In another aspect, a sensor includes an image acquisition controller, a first set of address lines, a second set of address lines, and an active thermal sensor pixel array. The pixel array includes a first set of pixels electrically coupled to the image acquisition controller via the first set of address lines and a second set of pixels electrically coupled to the image acquisition controller via the second set of address lines. The sensor is configured to operate in a first mode and a second mode. When operating in the first mode, the image acquisition controller is configured to address only the first set of pixels via the first set of address lines for generating a low-resolution image. When operating in the second mode, the image acquisition controller is configured to address the first set pixels via the first set of address lines and address the second set of pixels via the second set of address lines for generating a high-resolution image.

BRIEF DESCRIPTION OF THE DRAWINGS

The features of the embodiments described herein will be more fully disclosed in the following detailed description, which is to be considered together with the accompanying drawings wherein like numbers refer to like parts and further wherein.

DETAILED DESCRIPTION

This description of the exemplary embodiments is intended to be read in connection with the accompanying drawings, which are to be considered part of the entire written description. The drawing figures are not necessarily to scale and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The sensors described herein are configured such that they may operate at multiple scan resolutions. In use, one of the available scan resolutions can be selected to suit a required application. This allows the scan to be performed at a high resolution, for example to comply with heightened security standards, or at lower resolutions to minimize scan time and computing requirements. The determination of which scan resolution to use may be made, for example, just prior to performance of the scan. Alternatively, the determination may be made in advance based on various criteria. Although described herein with reference to scanning a fingerprint, it should be understood that the sensors and methods described herein can be used to scan any specimen, including, for example, palms, toes, lips and other body parts of humans or animals.

Figure 1:
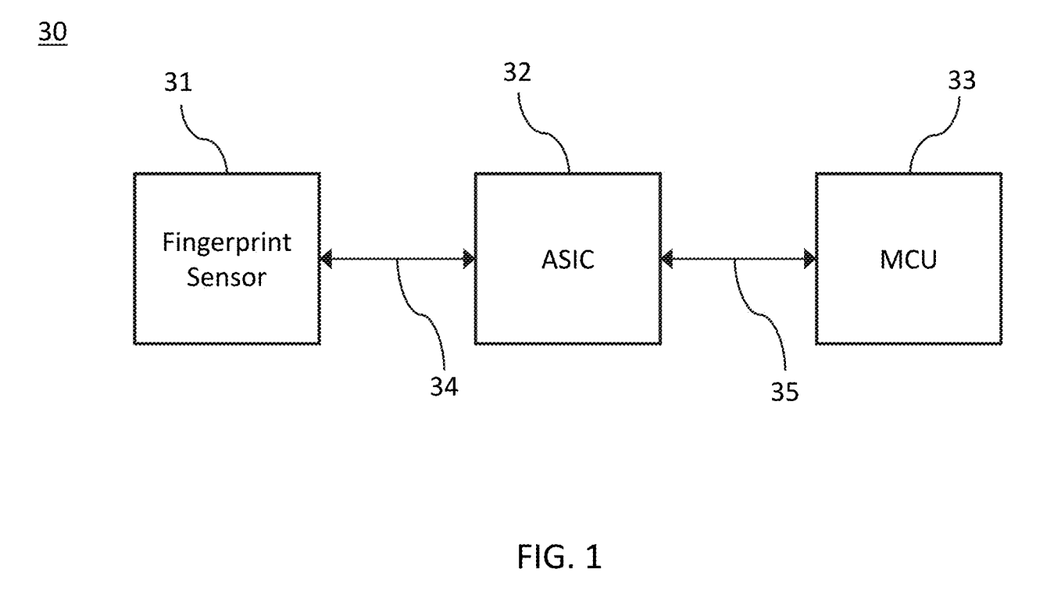
FIG. 1 shows a schematic illustration of a biometric sensor system.

FIG. 1 shows one possible architecture for a biometric system 30. A fingerprint sensor 31 captures an image of a fingerprint under control of an image capture application-specific integrated circuit (ASIC) 32 through an analog interface 34. Alternatively, in some embodiments, A/D conversion may occur within sensor 31 such that sensor 31 outputs a digital signal. For example, in embodiments in which sensor 31 includes a matrix of pixels (as described below), each pixel may include A/D conversion and output a digital signal to ASIC 32 or, alternatively, directly to MCU 33. ASIC 32 reads this image data out and transfers it via an interface 35 (e.g., SPI or USB interface) to an embedded microcontroller unit (MCU) 33. MCU 33 processes the image, extracts characteristic features and generates a fingerprint template, typically based on so-called "minutiae". MCU 33 may be provided with fingerprint matching functionality that compares the fingerprint template to a stored fingerprint sample to determine whether the template matches the sample. In various embodiments, the functionality of ASIC 32, MCU 33, and/or smart card chip can be integrated into a single chip or chips. System 30 may be used in, for example, a mobile phone, personal computer, access control system, a USB reader, a point of sale terminal, a smart card, or any other appropriate application. In embodiments, such as for smart credit card embodiments, the fingerprint template may be transferred to a smart card chip (integrated circuit card chip, ICC) where the storage and matching is performed in a so-called on-card biometric comparison application, sometimes also called "match-on-card" or "match-on-SE" (secure element).

Figure 2:
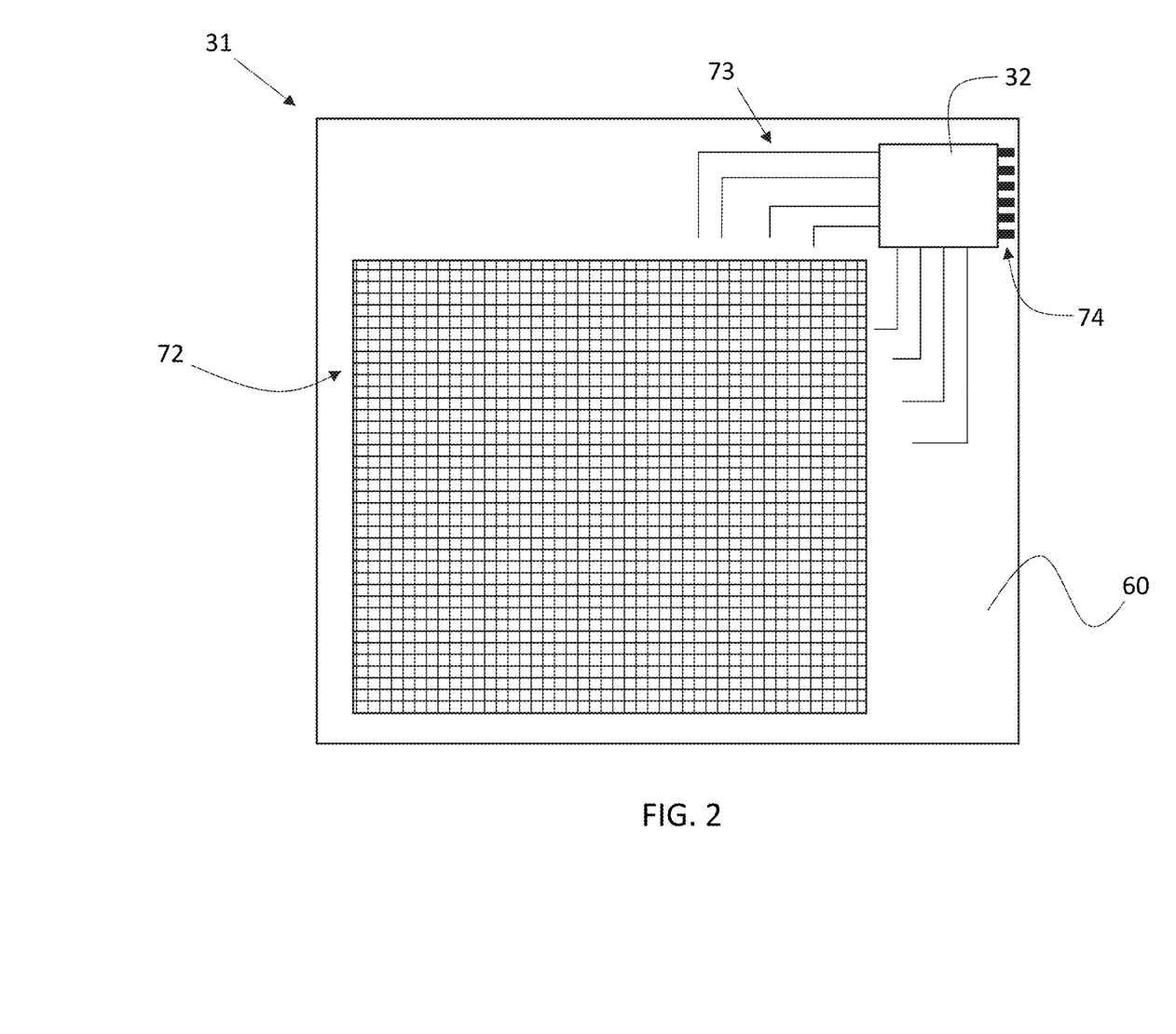
FIG. 2 shows a schematic illustration of a fingerprint sensor.

As shown in FIG. 2, fingerprint sensor 31 may include a substrate 60, a pixel matrix 72, circuitry 73, and connection points 74. In addition, in some embodiments, as shown in FIG. 2, ASIC 32 may be mounted to substrate 60. In various embodiments, the fingerprint sensor is a flexible sensor and substrate 60 is constructed of a flexible material such as, for example, polysilicon. Substrate 60 may also be constructed from plastic (e.g., polyethylene terephthalate, polyethylene naphthalate, etc.), a metal foil (e.g., steel, aluminum, etc.), a semiconductor material (e.g., silicon), quartz, glass or any material that is suitable for depositing microelectronic structures in production.

Pixel matrix 72 is provided over substrate 60. In various embodiments, pixel matrix 72 is formed over substrate 60 using a deposition process, such as, for example, low temperature poly-silicon (LTPS). Connection points 74 are electrically coupled to pixel matrix 72 and allow for connection to an external system, such as, for example, MCU 33. In various embodiments, a protective coating (not illustrated) may be applied over pixel matrix 72. As will be described further herein, surrounding circuitry 73 may include address lines that allow certain rows or columns of pixel matrix 72 to be selectively scanned or read.

In various embodiments, fingerprint sensor 31 operates on the active thermal sensing principle. In such embodiments, a low power heat pulse is applied to each sensor pixel over a short period of time and a response is measured. This type of fingerprint sensor may be produced with large area production processes such as those that form low temperature polysilicon (LTPS) thin film transistors and devices. In embodiments, the fingerprint sensor 31 is a sensor based on the active thermal sensing principle as described in, for example, U.S. Pat. No. 6,091,837 entitled "Sensor For Acquiring a Fingerprint" issued Jul. 18, 2000 and U.S. Pat. No. 7,910,902 entitled "Apparatus for Fingerprint Sensing" issued Mar. 22, 2011, the entireties of which are hereby incorporated by reference herein.

Figure 3:
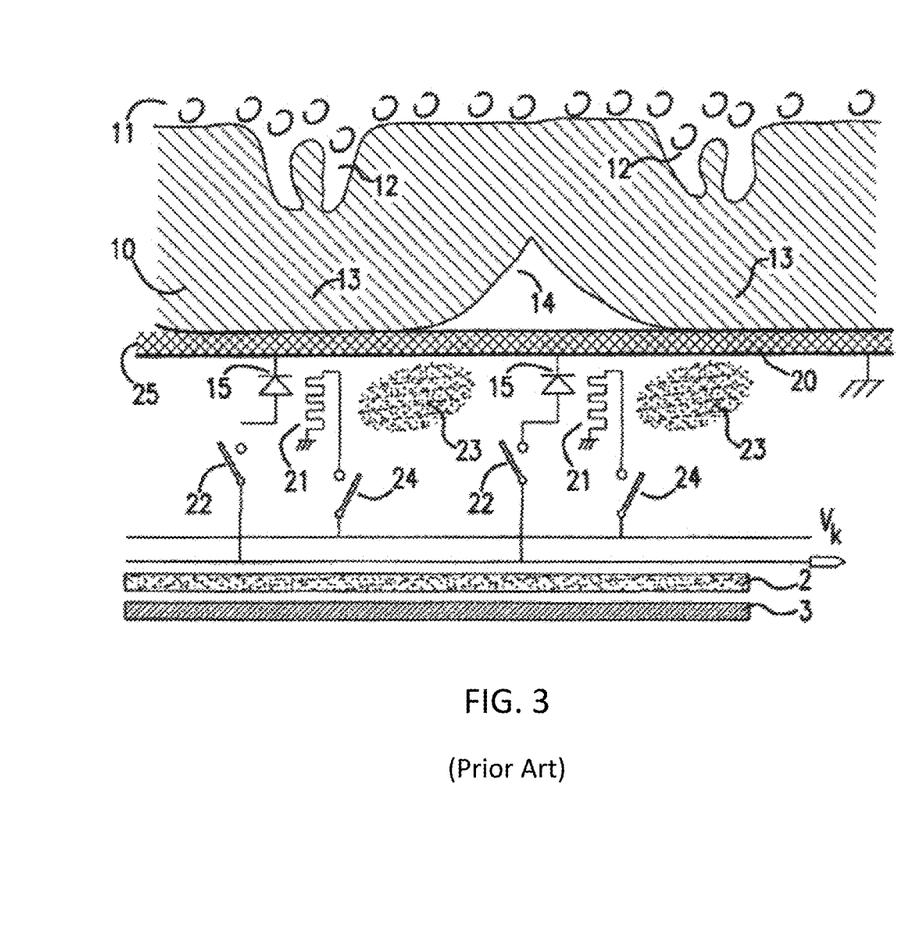
FIG. 3 shows a detailed schematic illustration of a sensor operating under the active thermal principle.

FIG. 3 corresponds to FIG. 4 of U.S. Pat. No. 6,091,837 and shows a schematic sketch of a layout of the electronic circuits of an active thermal principle sensor. The figure shows details of the contact surface between the sensor and the finger. The finger includes ridges 13 with valleys 14 between them. The skin includes an outer skin 10 (epidermis) with an area 11 behind it with circulation of blood (indicated by circular arrows). Underneath ridges 13 there are papilla 12 which, among other things, have blood circulation. Ridges 13 come in contact with the sensor and are heated, and the blood circulation in the finger transports the heat away. In valleys 14, the surface of the sensor is cooled essentially by two mechanisms, radiation and heat conduction to the air in valley 14. These cooling mechanisms are not as efficient as the heat conduction to ridges 13. As such, there is a difference between the temperature measured in ridges 13 and the temperature measured in valleys 14. These temperatures may be measured using sensor elements 15. Measurements from sensor elements 15 are collected and, using information regarding supplied energy, a pattern is made showing the fingerprint.

Each sensor element 15 has a corresponding heating element 21 producing a known amount of heat. In the example shown in FIG. 3, heating elements 21 are controlled centrally by an input voltage, $V_k$, and an electronic contact switch 24. It is, however, possible to provide the circuit with a separate control of each heating element to give a local control of the heat supply. The signal from the temperature sensor is addressed and controlled using an electronic contact switch 22, e.g. a double gate MosFET transistor. As will be described further herein, sensor elements 15 may be selectively addressed during use. This may allow the sensor to operate at full resolution or a reduced resolution. Heating elements 21 may include one or more resistors and the sensor elements may include one or more diodes.

The temperature at sensor elements 15 may be measured at one or more points of time or continuously. Using a plurality of, or continuously obtained, measurements, a picture may be obtained showing the effective heat capacity and/or conductivity at the different measuring points. For example, live skin cells have a high heat capacity due to a high content of water and the cells directly touching the sensor surface, which are typically dead cells, have a higher heat conductivity than the surrounding air in valleys 14. This difference in heat conductivity enhances the ability of the sensor to distinguish ridges 13 from valleys 14.

Positioned closest to the finger is an electrically conducting, grounded layer 20 made for example from aluminum or other conducting or semiconducting material. Layer 20 is configured to avoid electric disturbances from the surroundings and to prevent discharges from harming the sensor. The sensor may also include a second layer 25 made from a mechanically resistant material, such as, for example, $SiO_2$, $Si_3N_4$ or $\alpha\text{-}Al_2O_3$, to protect the sensor from mechanical stress and chemical corrosion. These layers 20, 25 may be sufficiently thin as not to hinder the heat transfer to the finger.

In various embodiments, an insulating material 23 is disposed between adjacent sensor elements 15, thereby limiting the heat conduction between the elements. The insulating material 23 may, for example, be made from $SiO_2$ or similar materials. The sensor may further include a thermal insulating layer 2. In various embodiments, the sensor further includes a heat conducting layer 3 to provide heat throughout the sensor.

In various embodiments, the pixel structure of the sensor has sufficient pixel density such that the sensor has the capability of scanning at a high resolution, such as at least 500 ppi. Such high-resolution scans may be advantageous for anti-spoofing or presentation attack detection. However, studies have shown that acceptable biometric performance (i.e., error rates) can also be achieved with a lower resolution, such as 300 ppi or 375 ppi. Such lower resolutions potentially allow for shorter scan times and a reduction in computational resources. As will be described further herein, the address lines of the sensor may be configured such that certain pixels may be omitted from a scan (i.e., skipped), thereby resulting in an optional lower scan resolution, such as, for example, 375 ppi or 300 ppi. The resolution of the scan, and the resulting image, may be the same in the horizontal and vertical directions. In other embodiments, as will be described in more detail herein, the resolution in the horizontal direction may be different than the resolution in the vertical direction.

This reduction in scan resolution may result in a significant reduction in scan time. For example, reducing the scan resolution from 500 ppi to 375 ppi results in a theoretical reduction (i.e., not accounting for boot time, protocol overhead, etc.) in scan time of 20%. Reducing the scan resolution from 500 ppi to 300 ppi results in a theoretical reduction in scan time of 40%. Further, the ability to selectively reduce the scan resolution may be combined with a so-called "partial scan" (i.e., reading out only part of the active area, for example around the center of the active scan area) to further reduce the scan time.

Figure 4:
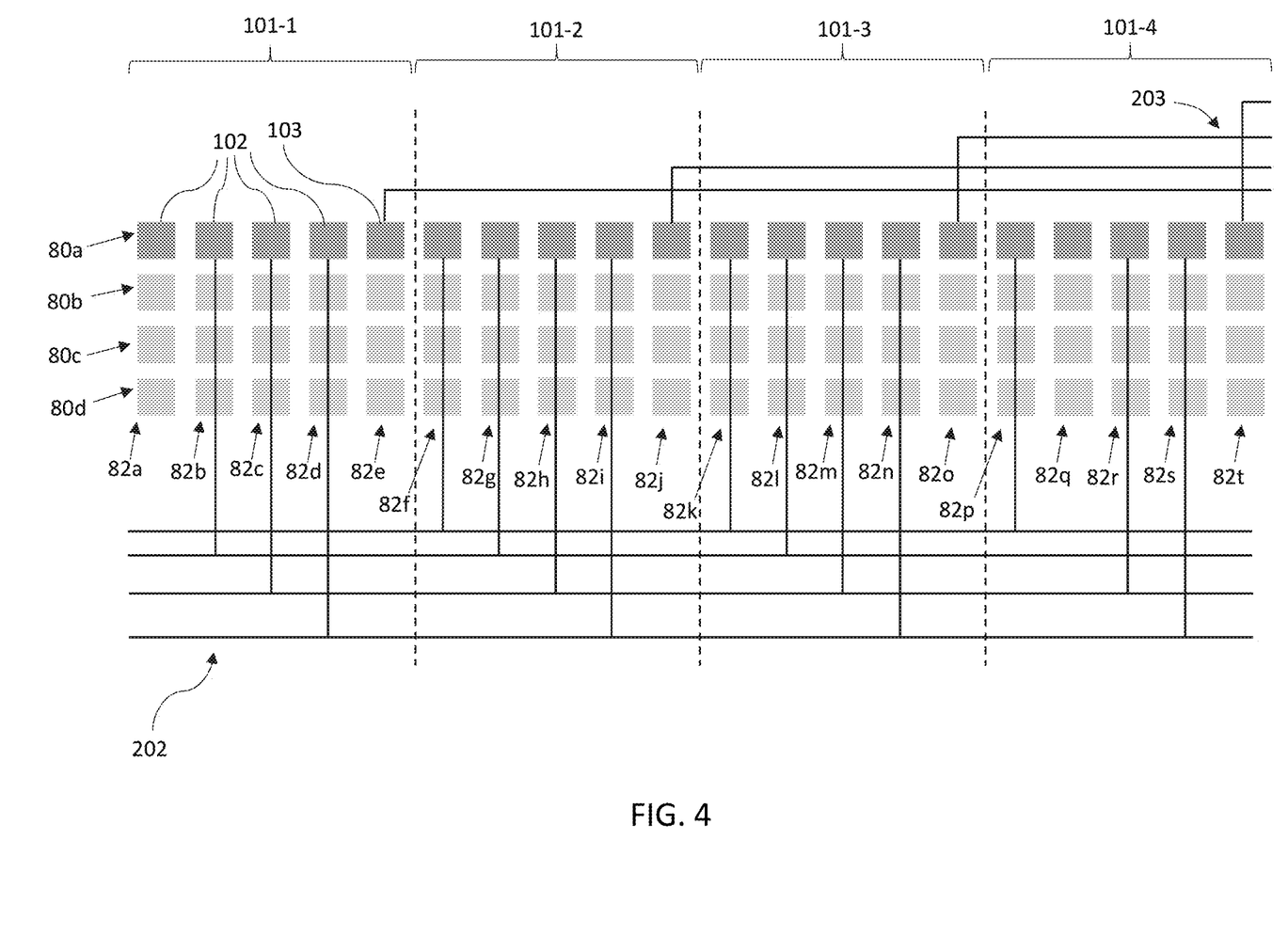
FIG. 4 illustrates a pixel array and address lines, according to one embodiment described herein.

FIG. 4 shows a magnified schematic view of pixel matrix 72. Pixel matrix 72 includes a plurality of columns 80 and a plurality of rows 82 of pixels. FIG. 4 shows four columns 80a-80d and twenty rows 82a-82t. However, it should be understood that this is exemplary only and pixel matrix 72 can include any number of pixels. In various embodiments, pixel matrix 72 may be divided into a plurality of pixel blocks 101. Each pixel block 101 may include any number of rows of pixels. For example, as shown in FIG. 4, each pixel block may include five rows 82 of pixels. Pixel block 101-1 includes rows 82a-82e, pixel block 101-2 includes rows 82f-82j, pixel block 101-3 includes rows 82k-82o, and pixel block 101-4 includes rows 82p-82t. Further, each pixel block 101 may include a set of one or more pixels designated as low-resolution pixels (e.g., pixels 102) and a set of one or more pixels designated as high-resolution pixels (e.g., pixel 103). In various embodiments, the low-resolution pixels 102 may be addressed or scanned by a first set of address lines 202 and the high-resolution pixels 103 may be scanned by a second set of address lines 203. As shown in FIG. 4, low-resolution pixels 102 and high-resolution pixels 103 may be positioned within the same column (e.g., column 80a) and, therefore have the same column address. While the pixels are referred to herein as low-resolution pixels and high-resolution pixels, it should be understood that there is not necessarily any difference in the configuration of the pixels or the associated hardware. Instead, these designations refer to whether or not the pixels are addressed only during operation in the low-resolution mode or when operating in both the low- and high-resolution modes, as will be described in more detail herein. Each pixel of pixel matrix 72 may include a sensor element 15 and a heating element 21, as shown in FIG. 3 and described above.

As noted above, sensor 31 may include two sets of address lines 202, 203. In various embodiments, both sets of address lines include four address lines and are associated with a four-channel ASIC, thereby allowing four pixels to be addressed and read simultaneously. In embodiments, the sensors and methods described herein make use of the simultaneous addressing and reading of pixels to minimize scan time. For example, as described herein, a set of four consecutive pixels of the same column and block (e.g., pixel block 101-1) may be addressed and read simultaneously. Subsequently, the ASIC then proceeds to the next pixel block (e.g., pixel block 101-2) until the entire column (e.g., column 80a) has been addressed and the column address is increased (e.g., to column 80b). While the embodiments described herein illustrate addressing of pixel matrix 72 column-wise, in other embodiments, the pixel matrix is configured to be addressed row-wise. In various embodiments, the scanning is performed by a single ASIC. In other embodiments, each set of address lines is associated with a separate ASIC.

As noted above, sensor 31 may be operated in one or more different modes. For example, sensor 31 may be operated in a high-resolution mode or a low-resolution mode. When operating in the low-resolution mode, only the low-resolution pixels (e.g., pixels 102) are addressed and scanned (i.e., switch 22 is closed and the output of sensor element 15 is read). Thus, the sensor may operate at less than its potential full resolution, thereby reducing scan time. When operating in high-resolution mode, all pixels, including low-resolution pixels 102 and high-resolution pixel 103, are addressed and scanned. For example, the low-resolution pixels (e.g., pixels 102) and high-resolution pixels (e.g., pixel 103) may be addressed and scanned sequentially. The arrangement of the pixel blocks, and their connection to separate sets of address lines allows for the maximum number of parallel channels to be used.

FIG. 4 shows an embodiment in which 4 out of 5 rows of pixels are connected as low-resolution pixels and one row of pixels of the same block of pixels 101 is connected as a high-resolution pixel. In one exemplary method of scanning the pixels of pixel matrix 72 in a high-resolution mode, the low-resolution pixels (e.g., pixels 102) of the first pixel block 101-1 are addressed. Because first set of channels 202 includes four channels, each of the low-resolution pixels in the first column 80a of first block 101-1 can be addressed simultaneously. Next, the low-resolution pixels of first column 80a of second block 101-2 are addressed. Again, each of the low-resolution pixels can be addressed simultaneously. The low-resolution pixels of first column 80a of third block 101-3 are then addressed. Next, the low-resolution pixels of first column 80a of fourth block 101-4 are addressed. After each low-resolution pixel in blocks 101-1 through 101-4 is addressed the high-resolution pixels in column 80a of each of blocks 101-1 through 101-4 are addressed using the second set of channels 203. The addressed pixels of column 80a are then assembled by ASIC 32 or MCU 33 to form a full resolution image of column 80a of blocks 101-1 through 101-4. The above steps can then be repeated for subsequent sets of blocks of pixels until all pixels in column 80a are addressed. After scanning each pixel of column 80a, the column address is incremented and the scanning process described above is performed for all rows (e.g., 80b-80d) of pixel matrix 72.

It should be understood that the order of the steps described above may be varied. For example, in some embodiments, all low-resolution pixels of a given column are addressed before the high-resolution pixels of that column. In other embodiments, all low-resolution pixels in all rows are addressed before subsequently addressing the high-resolution pixels.

When operating in the low-resolution mode, the steps associated with addressing the high-resolution pixels are not performed. In other words, only the first set of channels 202 is used to scan pixels. As a result, when operating in this mode, the time associated with addressing the high-resolution pixels is eliminated, thereby reducing the total time required to perform the scan of pixel matrix 72. For example, for the exemplary layout shown in FIG. 4, a scan in the low-resolution mode (e.g., 375 ppi) has a scan time that is approximately 20% shorter per column scanned than when operating in the high-resolution mode.

Figure 5:
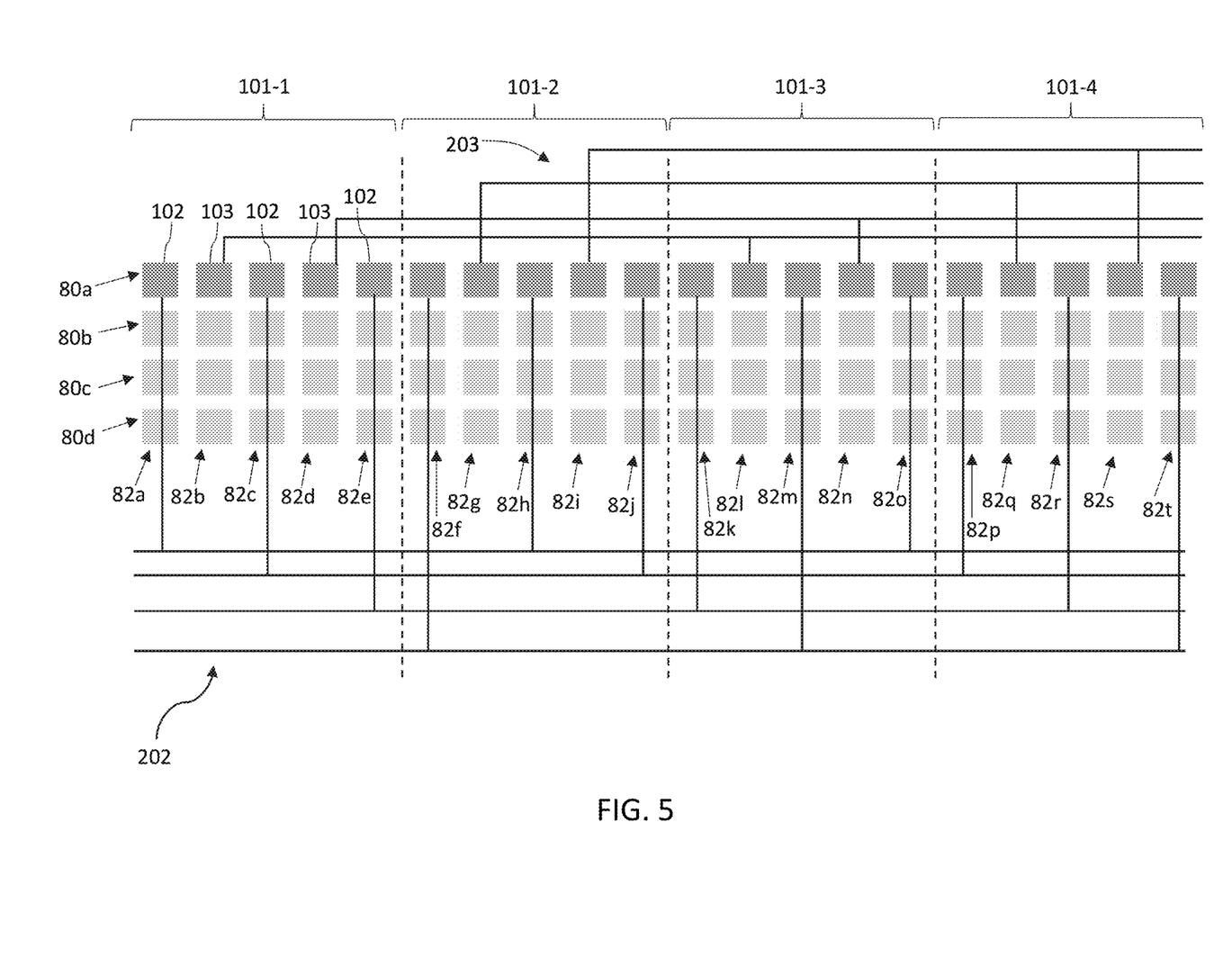
FIG. 5 illustrates a pixel array and address lines, according to another embodiment described herein.

Another embodiment is illustrated in the layout shown in FIG. 5. In this embodiment, in each column 80, the first, third, and fifth pixel of each block (e.g., block 101-1) are configured as low-resolution pixels 102 and the second and fourth pixels of each block are configured as high-resolution pixels. The scanning process proceeds similarly to that described above with reference to FIG. 4. In this embodiment, the first, third, and fifth pixels of first block 101-1 and the first pixel of second block 101-2 are addressed simultaneously using the four channels of the first set of channels 202. The third and fifth pixels of block 101-2 and the first and third pixels of block 101-3 are addressed simultaneously. Next, the fifth pixel of block 101-3 and the first, third, and fifth pixels of block 101-4 are addressed simultaneously. Subsequently, the second set of channels 203 simultaneously address the second and fourth pixels of block 101-2 and the second and fourth pixels of block 101-2. The second set of channels 203 also simultaneously address the second and fourth pixels of block 101-3 and the second and fourth pixels of fourth block 101-4. Such an embodiment may allow the resolution of the scan to be adjusted between, for example, a high resolution of 500 ppi and a low resolution of 300 ppi for each column. This results in a scan time reduction of about 40% for each column.

In some embodiments, when generating a high-resolution image based on image data received from both low-resolution pixels 102 and high-resolution pixels 103, system 30 (e.g., MCU 33) performs operations that compensate for the time that elapses between acquiring the image data from adjacent low-resolution pixels 102 and high-resolution pixels 103 to prevent loss in local pixel uniformity. Any appropriate process or algorithm may be used to prevent loss in local pixel uniformity. For example, the image data from the low-resolution and high-resolution pixels may be scaled or averaged. In embodiments in which the image data is averaged, the image data received from a high-resolution pixel 103 may be averaged with adjacent low-resolution pixels 102. These algorithms may be used to compensate for changes in moisture due to perspiration. The algorithms may also be used to compensate for blood pulses in the finger.

Table 1, below, provides the resolution of the configurations illustrated in FIGS. 4 and 5 when operating in the high resolution and low-resolution modes. Configuration 1 corresponds to the configuration shown in FIG. 4. Configuration 2 corresponds to the configuration shown in FIG. 5. Table 1 also indicates the approximate relative scan time (neglecting any protocol overhead, boot time or time required to clock over a column index without scanning pixels).

TABLE 1

Exemplary Pixel Addressing Configurations and Resulting Relative Scan Time

| Configuration | Pixel Block Size | Low Resolution Pixels Per Block | High Resolution Pixels Per Block | Full Resolution | Low Resolution Horizontal | Low Resolution Vertical | Low Res./ High Res. Scan Time |
|---|---|---|---|---|---|---|---|
| 1 | 5 | 4 | 1 | 500 ppi | 375 ppi | 500 ppi | 80% |
| 2 | 5 | 3 | 2 | 500 ppi | 300 ppi | 500 ppi | 60% |
| 3 | 5 | 4 | 1 | 500 ppi | 375 ppi | 375 ppi | 64% |
| 4 | 5 | 3 | 2 | 500 ppi | 300 ppi | 300 ppi | 36% |

Although the embodiments described herein illustrate the use of columns that include both low- and high-resolution pixels, it should be understood that other arrangements can be used, such as dividing rows into low- and high-resolution pixels. This may be accomplished using a similar method to that described above. Alternatively, certain columns may be skipped by simply clocking over the designated columns when operating in low-resolution operation mode. Configuration 3 in Table 1 is an example in which the configuration of FIG. 4 is combined with clocking over every fifth column in the low-resolution mode (labeled "low resolution vertical"). Configuration 4 in Table 1 is an example in which the configuration of FIG. 5 is combined with clocking over two out of every five columns in the low-resolution mode (labeled "low resolution vertical"). As can be seen in Table 1, in such embodiments the resolution is reduced in both the horizontal and vertical directions. While Table 1 illustrates embodiments in which clocking over columns is used in conjunction with the arrangement illustrated in FIGS. 4 and 5 and described above, it should be understood that clocking over columns may be used independently from skipping pixels within a given column.

Further, while FIGS. 4 and 5 illustrate exemplary embodiments, it should be understood that the blocks of pixels (e.g., blocks 101-1 through 101-4) can include any number of low-resolution pixels and high-resolution pixels. In general, each of the blocks include N number of consecutive pixels, with X number of those pixels being low-resolution pixels and Y number of those pixels being high-resolution pixels such that X+Y=N. In various embodiments, as described herein, X is greater than Y such that each block includes more low-resolution pixels than high-resolution pixels. In such embodiments, operation in the low-resolution mode yields an image with a resolution that is greater than half the resolution of the image generated when operating in the high-resolution mode. Further, in some embodiments, the pixels are divided into more than one set such that the sensor is configured to generate images in more than two resolutions.

Further, in some embodiments, the low- and high-resolution pixels in adjacent rows are aligned. For example, referring to FIG. 4, the fifth pixel in each column (i.e., the pixel in row 82e) may be a high-resolution pixel that is not scanned and addressed when the sensor is operating in the low-resolution mode. In other embodiments, the high-resolution pixels are staggered such that the high-resolution pixels are not adjacent to one another. For example, the fifth pixel of column 80a, the fourth pixel in column 80b, the third pixel in column 80c, and the second pixel in column 80d may be high-resolution pixels. By staggering the high-resolution pixels, the unscanned portions of the sample are further distributed, which may increase the accuracy or reliability of the scan.

In various embodiments, the sensor is configured such that every other pixel is a low-resolution pixel, with the other pixels being high-resolution pixels. In the first column, for example, the even-numbered pixels (e.g., the pixel in rows 82b, 82d, 82f, etc.) are high-resolution pixels that are not addressed when the sensor is operating in the low-resolution mode. In the second column, the odd-numbered pixels (e.g., the pixel in rows 82a, 82c, 82e, etc.) are high-resolution pixels that are not addressed when the sensor is operating in low-resolution mode. This arrangement may continue for subsequent columns (e.g., the even-numbered pixels are high-resolution pixels in the third column, the odd-numbered pixels are high-resolution pixels in the fourth column, etc.). Because the high-resolution pixels are not aligned in adjacent columns, the regions of the sample that are not scanned are discontinuous. This may reduce the risk of misidentification of features of the sample. Further, the smaller unscanned regions may allow for more accurate interpolation between the scanned pixels. Because only half of the pixels are being scanned, the scan time and processing time may be reduced by approximately one half when compared to a full resolution scan.

In embodiments in which the columns are also selectively scanned (e.g., every other column is clocked over when scanning in low-resolution mode), the high-resolution pixels in the columns that are scanned when operating in the low-resolution mode may be staggered. For example, in embodiments in which only the odd-numbered columns (e.g., 80a, 80c, etc.) are scanned when operating in the low-resolution mode, the even-numbered pixels (e.g., pixels in rows 82b, 82d, 82f, etc.) in the first column 80a may be high-resolution pixels and the odd-numbered pixels (e.g., pixels in rows 82a, 82c, 82e, etc.) in the third column 80c may be high-resolution pixels. As described above, by staggering the high-resolution pixels, the unscanned regions of the sample are broken up into smaller regions. Because only a quarter of the pixels are scanned, the scan and processing time may be reduced to approximately one fourth of the time required for a full-resolution scan.

According to scientific publications in forensic sciences, the average fingerprint ridge width in adult persons ranges typically from 0.4 mm to 0.5 mm. See e.g., A. R. Roddy and J. D. Stosz, *Fingerprint Features—Statistical Analysis and System Performance Estimates*, Proceedings of the IEEE, Vol. 85, No. 9, pp. 1390-1422, 1999. A resolution of 300 ppi equates to 11.8 pixels per mm or 4.7 to 5.9 pixels per ridge. Based on Nyquist frequency theory, this may be sufficient to reliably determine the presence and position of ridges and extract features such as, for example, ridge-ends and bifurcations commonly used in automated fingerprint recognition or biometric comparison. It should be understood that the above designs are only examples and different combinations of resolutions may be realized with alternative pixel block size, resolution and division between low-resolution and high-resolution pixels.

In various embodiments, the multiple-resolution pixel addressing configurations and methods described above may be combined with a partial image scan to further reduce the scan time. In embodiments in which the partial scan area is half the width and height of the total active area of pixel matrix 72, scanning only part of the total area allows the scan to be performed in approximately 25% of the time it would take to perform a full resolution scan of the entire scan area. Further, a scan of an area covering 70% of both the width and height of the total scan area of pixel matrix 72 can be scanned in approximately 49% of the time it would take to perform a full resolution scan on the entire scan area. When combined with the low-resolution scans described above, the respective reduction in scan times are multiplied to provide the final scan time. For example, using configuration 1 in Table 1 in combination with a scan of half the width and height of the scan area results in a scan time of 20% of a full resolution scan of the entire area.

The portion of pixel matrix 72 that is scanned can be determined using any appropriate method. In various embodiments, the portion to be scanned is predetermined. For example, a partial fingerprint image may be obtained from only the center region of the pixel matrix 72. This may provide sufficient area to ensure that at least a portion of the fingerprint is scanned and that sufficient detail is provided to verify the identity of the user. In other embodiments, the scanned portion of pixel matrix 72 may be determined dynamically. For example, sensor 31 may further include sensors—such as pressure sensors, optical sensors, or capacitance sensors (e.g., electrodes)—to determine which portion of pixel matrix 72 is in contact with the user's finger, with only those portions being scanned. Further, in some embodiments, system 30 assesses relevant properties of the finger to be scanned and uses this information to determine whether to perform a scan of the full pixel matrix as well as whether to perform the scan at a low-resolution or a high-resolution. For example, system 30 may determine the current finger condition (e.g., dry finger versus wet or oily finger) to decide on a scan procedure with the goal of minimizing overall scan time while maintaining a high level of biometric performance.

Table 2, below, lists typical use cases and recommended scan operations. For example, for high security applications such as applications that must comply with government scans, a full resolution scan may be performed on the entire scan area. In applications that do not need to comply with government standards, a reduced resolution scan may be performed over the full scan area. This may allow for reliable identification of the fingerprint while also reducing scan time and computational resources.

In other applications, it may be desirable to identify very small or micro features of the finger. In such applications, a full resolution scan may be performed over the full scan area or a part thereof.

In other applications, in which reduced scan time is desirable—such as fast authentication of the user, producing a live image of the finger, or determining the finger condition—a reduced resolution scan may be performed over only a part of the active scan area. With respect to fast authentication, in some embodiments, if the initial, "fast" scan is rejected (i.e., the identity of the user is not verified), a full scan can be performed immediately and automatically afterwards to verify the results of the fast authentication, thereby reducing average response time.

In some embodiments, it is advantageous to assess certain properties of the finger (e.g., determining whether the finger is dry or oily). For example, the amount of moisture on the finger affects the heat conductivity of the finger. This information may be used, for example, to determine the reliability of the scan (e.g., the accuracy of the resulting image) or to adjust certain parameters used during the scan (e.g., the heating time of the pixels). In such applications (referred to as "determine finger condition" in Table 2), a low-resolution scan of a portion of the pixel matrix may be performed to gather sufficient data to assess the finger condition. In some embodiments, a subsequent scan is then performed with certain processing parameters (such as heating of the pixels) adjusted based on the information received from the initial scan. Additionally, or alternatively, the reliability of the subsequent scan may be assessed based on the finger condition identified in the initial scan.

In other applications, a full resolution scan may be performed over a part of the scan area in order to detect presentation attacks.

TABLE 2

Exemplary Use Case Scenarios and Recommended Scan Operation Modes

| Use Case | Resolution | Scan Area |
|---|---|---|
| government compliant image scan | full | full |
| reliable identification | reduced | full |
| evaluating micro features (e.g., sweat pores, incipient ridges or certain ridge shape details) | full | full/partial |
| fast authentication | reduced | partial |
| fast live image | reduced | partial |
| determine finger condition | reduced | partial |
| presentation attack detection | full | partial |

Figure 6:
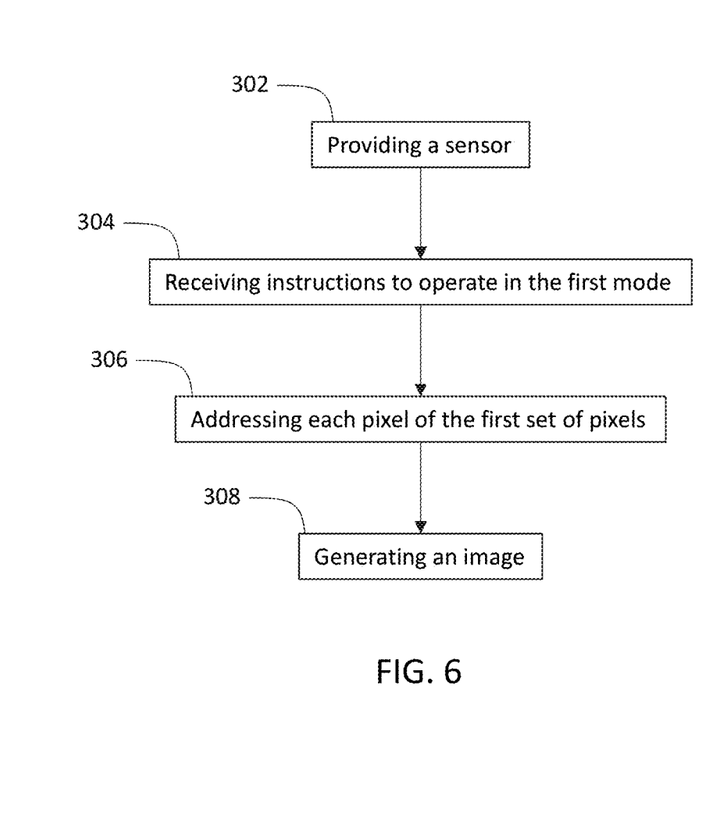
FIG. 6 illustrates a method of generating an image of a fingerprint, according to one embodiment described herein.

FIG. 6 illustrates a method of obtaining a fingerprint image, according to one embodiment. At step 302, a sensor is provided. The sensor may be according to any of the embodiments described herein and may include an MCU and a pixel array. The pixel array may include a first set of pixels electrically coupled to the MCU and a second set of pixels electrically coupled to the MCU. The sensor is configured to operate in a first (low-resolution) mode or a second (high-resolution) mode. At step 304, instructions are received to operate in the first (low-resolution) mode. At step 306, each pixel of the first set of pixels is addressed. At step 308, an image is generated based on a signal received from each pixel of the first set of pixels.

In some embodiments, such as the fast authentication techniques described above with reference to Table 2, if the image that is generated does not match an expected profile, the method may further include receiving instructions to operate in the second mode, addressing each pixel of the second set of pixels, and generating an image based on the signal received from each pixel of the first and second sets of pixels. In such embodiments, the high-resolution mode is only invoked if the identity of the user is not verified based on the first, low-resolution, scan.

Figure 7:
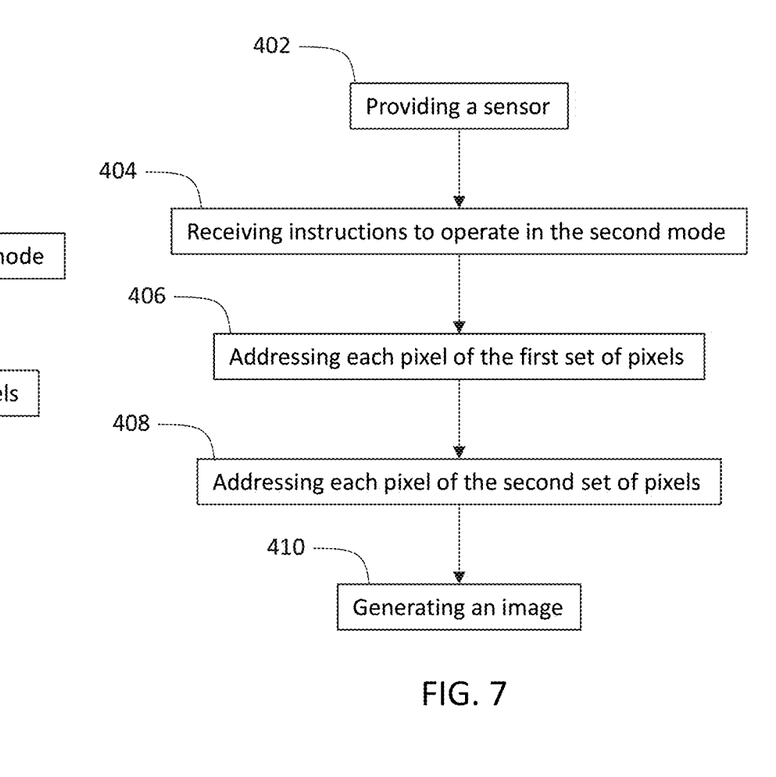
FIG. 7 illustrates a method of generating an image of a fingerprint, according to another embodiment described herein.

FIG. 7 illustrates a method of obtaining a fingerprint image, according to another embodiment. At step 402, a sensor is provided. The sensor may be according to any of the embodiments described herein and may include an MCU and a pixel array. The pixel array may include a first set of pixels electrically coupled to the MCU and a second set of pixels electrically coupled to the MCU. The sensor is configured to operate in a first (low-resolution) mode or a second (high-resolution) mode. At step 404, instructions are received to operate in the second (high-resolution) mode. At step 406, each pixel of the first set of pixels is addressed. At step 408, each pixel of the second set of pixels is addressed. At step 410, an image is generated based on a signal received from each pixel of the first and second sets of pixels.

It should be understood that the methods of FIGS. 6 and 7 may operate across a full scan area or a partial scan area as discussed above.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention. All patents and published patent applications identified herein are incorporated herein by reference in their entireties.

We claim:

1. A sensor, comprising:
an image acquisition controller; and
a pixel array, the pixel array including a first set of pixels electrically coupled to the controller and a second set of pixels electrically coupled to the controller;
wherein the pixel array includes:
a first column of pixels having pixels of the first set of pixels and pixels of the second set of pixels; and
a second column of pixels adjacent to the first column of pixels, the second column of pixels having pixels of the first set of pixels and pixels of the second set of pixels;
wherein the pixels of the second set of pixels in the first column are in different rows of the pixel array than the pixels of the second set of pixels in the second column;
wherein the sensor is configured to operate in a first mode and a second mode;

wherein, when operating in the first mode, the controller is configured to acquire signals from only the first set of pixels for generating a low-resolution image; and wherein, when operating in the second mode, the controller is configured to acquire signals from both the first set of pixels and the second set of pixels for generating a high-resolution image.

2. The sensor of claim 1, further comprising:
a first set of address lines electrically coupling the first set of pixels to the controller; and
a second set of address lines electrically coupling the second set of pixels to the controller.

3. The sensor of claim 1, wherein the sensor is configured to, when operating in the second mode, generate an image with a resolution of at least 500 pixels per inch in both a horizontal direction and a vertical direction.

4. The sensor of claim 3, wherein the sensor is configured to, when operating in the first mode, generate an image with a resolution of less than 500 pixels per inch in at least one of the horizontal direction or the vertical direction.

5. The sensor of claim 3, wherein the sensor is configured to, when operating in the first mode, generate an image with a resolution selected from the group consisting of 300 pixels per inch and 375 pixels per inch in at least one of the horizontal direction and the vertical direction.

6. A sensor, comprising:
a pixel array, the pixel array including a plurality of rows and a plurality of columns;
a first set of address lines; and
a second set of address lines;
wherein each column of pixels includes a first set of pixels and a second set of pixels, and wherein the first set of pixels is electrically coupled to the first set of address lines and the second set of pixels is electrically coupled to the second set of address lines;
wherein the first set of address lines is operable in a low-resolution mode of the sensor, and both the first set of address lines and the second set of address lines are operable in a high-resolution mode of the sensor, and
wherein each column or row of the pixel array includes a plurality of blocks of N number of consecutive pixels, each of the plurality of blocks including X number of pixels of the first set of pixels and Y number of pixels of the second set of pixels, wherein N=X+Y and X is greater than Y.

7. The sensor of claim 6, wherein each column of the pixel array includes a plurality of blocks of five consecutive pixels, each of the plurality of blocks including four pixels of the first set of pixels and one pixel of the second set of pixels.

8. The sensor of claim 7, wherein the first set of address lines includes four address lines and each address line of the first set of address lines is electrically coupled to one of the four pixels of the first set of pixels in each of the plurality of blocks.

9. The sensor of claim 6, wherein each column of the pixel array includes a plurality of blocks of five consecutive pixels, each of the plurality of blocks including three pixels of the first set of pixels and two pixels of the second set of pixels.

10. The sensor of claim 6, wherein the first set of address lines and the second set of address lines each include four address lines.

11. A sensor, comprising:
an image acquisition controller;
a first set of address lines;
a second set of address lines; and
an active thermal sensor pixel array, the pixel array including a first set of pixels electrically coupled to the image acquisition controller via the first set of address lines and a second set of pixels electrically coupled to the image acquisition controller via the second set of address lines;
wherein each column or row of the pixel array includes a plurality of blocks of N number of consecutive pixels, each of the plurality of blocks including X number of pixels of the first set of pixels and Y number of pixels of the second set of pixels, wherein N=X+Y and X is greater than Y;
wherein the sensor is configured to operate in a first mode and a second mode;
wherein, when operating in the first mode, the image acquisition controller is configured to address only the first set of pixels via the first set of address lines for generating a low-resolution image; and
wherein, when operating in the second mode, the image acquisition controller is configured to address the first set of pixels via the first set of address lines and address the second set of pixels via the second set of address lines for generating a high-resolution image.

12. The sensor of claim 11, wherein:
the first set of address lines includes X number of address lines each of which is coupled to one of the pixels of the first set of pixels in each of the plurality of blocks; and
the second set of address lines includes Y address lines each of which is coupled to one pixel of the second set of pixels in Y successive blocks of pixels.

13. The sensor of claim 11, wherein, when operating in the second mode, the image acquisition controller is configured to, for a selected row or column of the pixel array including the plurality of blocks of N number of consecutive pixels:
(i) select a subset of the blocks from the plurality of blocks of pixels; and
(ii) for the selected subset of the blocks:
on a block-by-block basis within the selected subset, sequentially obtain image data from the first set of pixels from each of the plurality of blocks in the selected subset; and
across the plurality of blocks in the selected subset, sequentially obtain image data from the second set of pixels from the plurality of blocks in the selected subset.

14. The sensor of claim 13, wherein, when operating in the second mode, the image acquisition controller is further configured to repeat operations (i) and (ii) until image data has been obtained from pixels in all blocks from the plurality of blocks.

15. The sensor of claim 11, wherein, when operating in the second mode, the image acquisition controller is configured to:
obtain image data from each pixel of the first set of pixels in a selected first row or column of the pixel array; and
before or after obtaining the image data from each pixel of the first set of pixels, obtain image data from each pixel of the second set of pixels in the selected first row or column of the pixel array.

16. The sensor of claim 15, wherein, when operating in the second mode, the image acquisition controller is further configured to, after obtaining image data from each pixel of the first and the second sets of pixels in the selected first row or column:
obtain image data from each pixel of the first set of pixels in a selected second row or column of the pixel array; and before or after obtaining the image data from each pixel of the first set of pixels, obtain image data from each pixel of the second set of pixels in the selected second row or column of the pixel array.

17. The sensor of claim 16, wherein the sensor further comprises a processor configured to generate the low-resolution image or the high-resolution image, and wherein when operating in the second mode, the processor is configured to perform operations that compensate for time elapsed between obtaining the image data from the first set of pixels and obtaining the image data from the second set of pixels.

18. The sensor of claim 17, wherein the operations performed by the processor include at least one selected from the group consisting of: (i) scaling image data obtained from the first set of pixels and image data obtained from the second set of pixels and (ii) averaging image data obtained from a pixel of the second set of pixels with image data obtained from adjacent pixels of the first set of pixels.

* * * * *